United States Patent
Chang et al.

(10) Patent No.: US 9,913,140 B2
(45) Date of Patent: Mar. 6, 2018

(54) USER EQUIPMENT IN MOBILE COMMUNICATION SYSTEM AND CONTROL METHOD THEREOF

(71) Applicant: Samsung Electronics Co., Ltd., Gyeonggi-do (KR)

(72) Inventors: Sunny Chang, Gyeonggi-do (KR); Tu Nguyen, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/205,550

(22) Filed: Jul. 8, 2016

(65) Prior Publication Data

US 2017/0026832 A1    Jan. 26, 2017

(30) Foreign Application Priority Data

Jul. 22, 2015 (KR) .................. 10-2015-0103459

(51) Int. Cl.
*H04M 1/66* (2006.01)
*H04W 12/06* (2009.01)
*H04W 48/20* (2009.01)

(52) U.S. Cl.
CPC ............ *H04W 12/06* (2013.01); *H04W 48/20* (2013.01)

(58) Field of Classification Search
None
See application file for complete search history.

(56) References Cited

U.S. PATENT DOCUMENTS

| 6,370,380 | B1 * | 4/2002 | Norefors | H04L 63/126 370/331 |
| 2011/0312299 | A1 * | 12/2011 | Patil | H04L 63/20 455/410 |
| 2012/0275340 | A1 * | 11/2012 | McGann | H04W 24/02 370/254 |
| 2013/0198817 | A1 * | 8/2013 | Haddad | H04L 63/18 726/5 |
| 2013/0283341 | A1 | 10/2013 | Park et al. | |
| 2015/0365822 | A1 * | 12/2015 | Sharma | H04W 12/04 455/410 |

* cited by examiner

*Primary Examiner* — Shantell L Heiber
(74) *Attorney, Agent, or Firm* — The Farrell Law Firm, P.C.

(57) ABSTRACT

Methods and apparatuses are provided for controlling a user equipment (UE) in a mobile communication system is provided. A first security mode command message for security authentication of the UE is received from a first base station (BS). It is determined whether a cell reselection event between the UE and a second BS is generated before the security authentication with the first BS is completed. The UE is controlled so that security states of the UE and the second BS match, when the cell reselection event is generated before the security authentication with the first BS is completed.

20 Claims, 5 Drawing Sheets

USER EQUIPMENT IN MOBILE COMMUNICATION SYSTEM AND CONTROL METHOD THEREOF

PRIORITY

This application claims priority under 35 U.S.C. § 119(a) to Korean Patent Application Serial No. 10-2015-0103459, which was filed in the Korean Intellectual Property Office on Jul. 22, 2015, the content of which is incorporated herein by reference.

BACKGROUND

1. Field of the Disclosure

The present disclosure relates generally to a user equipment in a mobile communication system and a control method thereof and, more particularly, to a user equipment that can prevent throughput degradation of a mobile communication system due to a mismatch of security states between the user equipment and a base station.

2. Description of the Related Art

Recently developed mobile communication systems may include a long term evolution (LTE) system or a universal mobile telecommunication system (UMTS) in a high speed data communication service (e.g., the $3^{rd}$ generation partnership project (3GPP)), which wirelessly provides various multimedia services.

FIG. 1 is a diagram illustrating a security authentication procedure between a user equipment and a base station in a mobile communication system (e.g., the UMTS system) proposed in the 3GPP.

Referring to FIG. 1, a base station (BS) 110 transmits a security mode command message to a user equipment (UE), in step 120, in order to exchange security information. The security mode command message may include ciphering information and integrity information.

When the security mode command message is received from the BS 110, the UE 100 may configure the ciphering information and the integrity information (e.g., a key value and/or algorithm type) included in the security mode command message. The UE transmits a security mode complete message to the BS 110, in step 130.

When the security mode complete message is received from the UE 100, the BS 110 transmits a response (e.g., an L2Ack in a layer 2 level) to the security mode complete message to the UE 100, in step 140. When the response (e.g., the L2Ack) has been received from the BS 110, the UE 100 may determine that the security authentication procedure is completed. Further, the BS 110 may determine that the security authentication procedure is completed at a time when the response is transferred to the UE 100.

SUMMARY

An aspect of the present disclosure provides a UE and corresponding method that can prevent a decrease in the throughput of the mobile communication system, which occurs due to a mismatch in security states.

According to an embodiment of the present disclosure, a UE in a mobile communication system is provided. The UE includes a communication module for exchanging first security authentication messages with a first BS for security authentication of the UE. The UE also includes a storage module for storing first security information included in at least one of the first security authentication messages. The UE further includes a control module for, when a cell reselection event between the UE and a second BS is generated before the security authentication with the first BS is completed, controlling the UE so that security states of the UE and the second BS match.

According to another embodiment of the present disclosure, a method of controlling a UE in a mobile communication system is provided. A first security mode command message for security authentication of the UE is received from a first BS. It is determined whether a cell reselection event between the UE and a second BS is generated before the security authentication with the first BS is completed. The UE is controlled so that security states of the UE and the second BS match, when the cell reselection event is generated before the security authentication with the first BS is completed.

According to an additional embodiment of the present disclosure, a mobile communication system is provided that includes a first BS, a second BS, and a UE for exchanging first security authentication messages with the first BS for security authentication of the UE. The UE matches security states of the UE and the second BS when a cell reselection event between the UE and the second BS is generated before the security authentication with the first BS is completed.

According to a further embodiment of the present disclosure, a method of controlling a UE in a mobile communication system is provided. The UE receives, from a first BS, a first security mode command message for security authentication of the UE. The first security mode command message includes first security information. The first security information is stored at the UE. The UE transmits, to the first BS, a security mode complete message, in response to the security mode command message. The UE performs cell reselection with a second BS prior to reception of an acknowledgement of the security mode complete message from the first BS. Security states of the UE and the second BS are matched.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
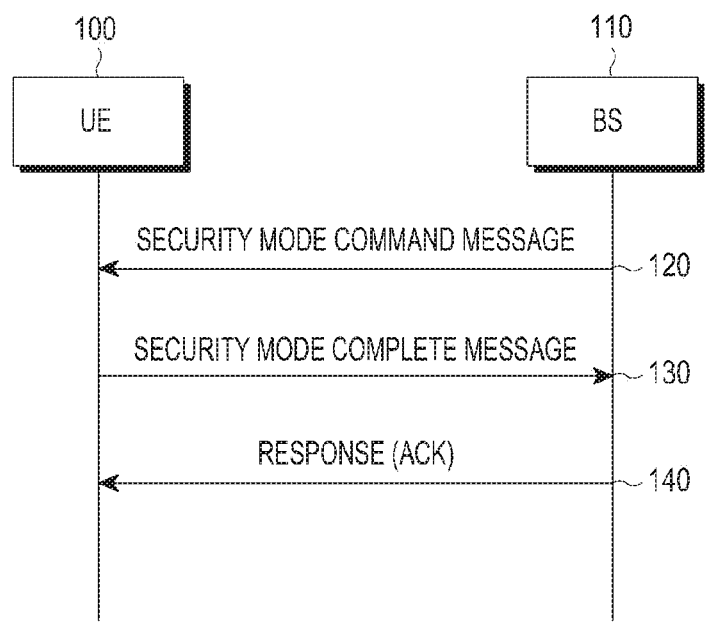
FIG. 1 is a diagram illustrating a security authentication procedure between a UE and a BS in a mobile communication system of the 3GPP.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Although the terms including an ordinal number such as, for example, first, second, and third, can be used to describe various elements, the elements are not restricted by the terms. Instead, the terms are used merely for the purpose of distinguishing an element from other elements. For example, a first element may be referred to as a second element, and similarly, a second element may be referred to as a first element, without departing from the scope of the present disclosure. As used herein, the term "and/or" includes any and all combinations of one or more associated items.

The terms used herein describe particular embodiments and are not intended to limit the disclosure. As used herein, singular forms are intended to include plural forms as well, unless the context clearly indicates otherwise. It should be understood that the terms "include" and "have" indicate the existence of a feature, a number, a step, an operation, a structural element, parts, or a combination thereof, and do not exclude the existence or probability of one or more additional features, numeral, steps, operations, structural elements, parts, or combinations thereof.

Unless defined differently, all terms used herein, which include technical and scientific terminologies, have the same meanings as those understood by a person skilled in the art to which the present disclosure belongs. Terms, which are identical to those defined in general dictionaries, should be interpreted as having meanings identical to those in the context of the related technique. The terms should not be ideally or excessively interpreted to have a formal meaning.

According to the conventional security authentication procedure, when a cell reselection event is generated before the UE 100 receives a response to a transmitted security mode complete message, a throughput of the mobile communication system may be reduced. The cell reselection event may refer to a case in which, for example, the UE 100 is required to be connected to a new BS.

Figure 2:
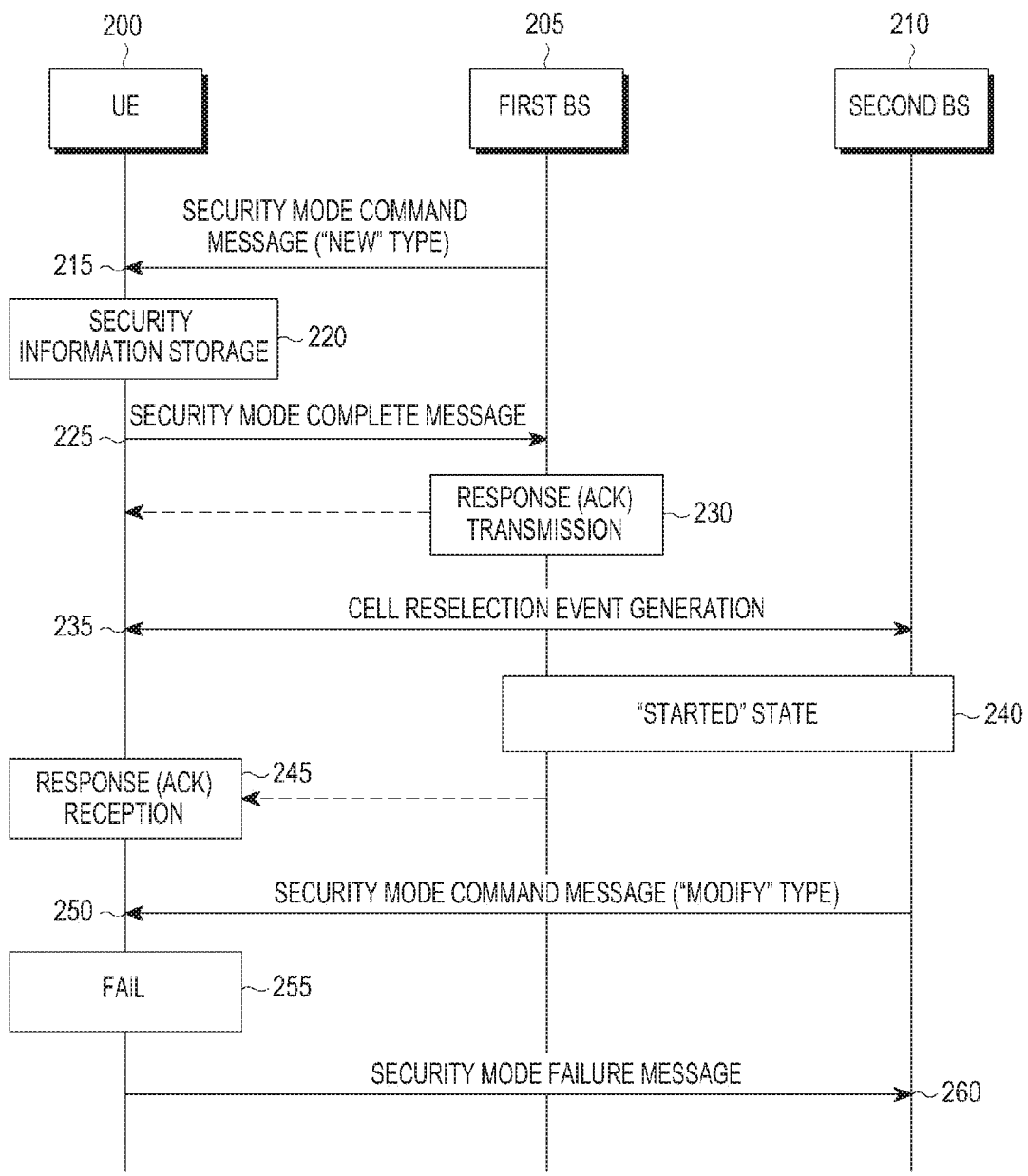
FIG. 2 is a diagram illustrating generation of a cell reselection event in a conventional authentication procedure.

FIG. 2 is a diagram illustrates generation of a cell reselection event in a conventional authentication procedure.

Referring to FIG. 2, a UE 200 receives a security mode command message from a first BS 205 for security authentication, in step 215. The UE 200 stores security information included in the security mode command message, at the UE 200, in step 220. The security mode command message received from the first BS 205 may correspond to a message having a "new" attribute. The "new" attribute may refer to an attribute of a security mode command message received when the security authentication procedure is performed between the BS (e.g., the first BS 205) and the UE (e.g., the UE 200). The term "new attribute" may be used in place of terms such as "new type", "start attribute", or "start type".

As illustrated in and described with respect to FIG. 1, the UE 200 transmits the security mode complete message to the first BS 205, in step 225, in response to step 215. Further, as illustrated in and described with respect to FIG. 1, the first BS 205 transmits a response to the security mode complete message to the UE 200, in step 230.

However, a cell reselection event is generated in step 235, before the UE 200 receives the response. The first BS 205 transmits the response to the UE 200 in step 230 and then configures (or changes) a security state of the first BS 205 to a "started" state, in step 240. Change information of the security state of the first base station 205 is shared with a second BS 210 through a mobility management entity (MME) (e.g., MME 340 of FIG. 3). Therefore, a security state of the second BS 210 is configured as a "started" state, in step 240. The UE 200 has not yet received the response (i.e., the L2ACK) from the first BS 205 at a time when the cell reselection event is generated, in step 235, thereby causing a determination that the security authentication is in an incomplete (or aborted) state. Since the response, which the UE 200 receives from the first base station 205, in step 245, after the cell reselection event is generated, in step 235, is not received from the second base station 210, to which the UE 200 has been newly connected according to the generation of the cell reselection event, in step 235, the UE 200 may disregard (delete or discard) the response received from the first BS 205, in step 245.

According to the generation of the cell reselection event in step 235, the UE 200 receives the security mode command message from the second BS 210, in step 250. The security mode command message received from the second BS 210 may correspond to a message having a "modify" attribute. The term "modify attribute" may refer to a type of a message that only includes information to be changed among various pieces of security information (e.g., the integrity information and ciphering information) stored in the UE 200. The term "modify attribute" may be used in place of "modify type".

However, according to the conventional security authentication procedure, the UE 200 is not in a state in which the security authentication procedure has been completed. Therefore, even though a security mode command message having the "modify attribute" is received, it is recognized as a "failure", in step 255. Accordingly, the UE 200 transmits a security mode failure message to the second BS 210, in step 260. According to a mismatch of states related to security authentication between the UE 200 and the BSs 205 and 210, unnecessary time is spent resuming communication between the UE 200 and the second BS 210, thereby decreasing the throughput of the mobile communication system.

Embodiments of the present disclosure provide a UE and a method that prevent a decrease in the throughput of the mobile communication system even when a cell selection event is generated before a response to a security mode complete message is received from a BS.

Figure 3:
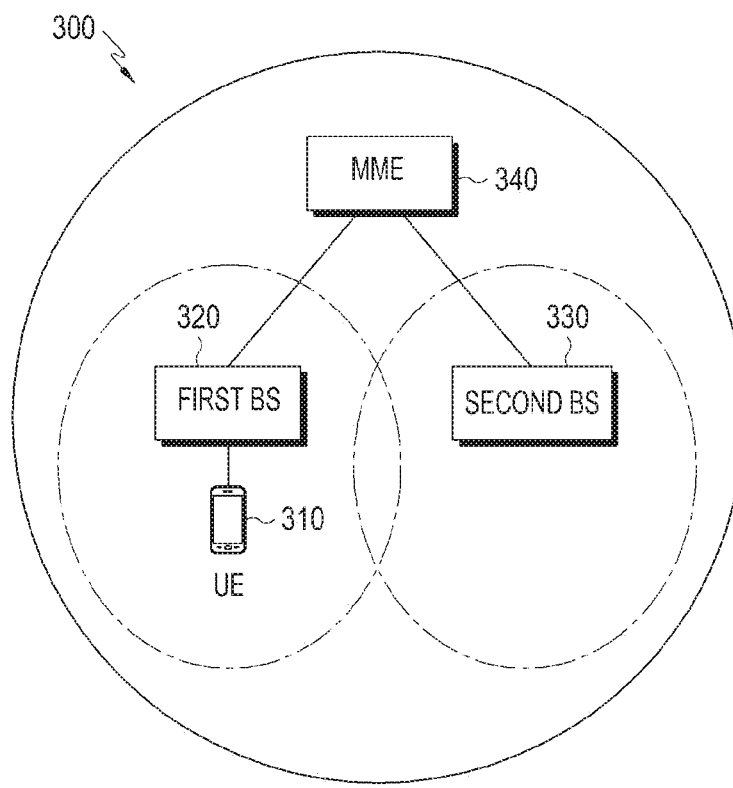
FIG. 3 is a diagram illustrating a mobile communication system, according to an embodiment of the present disclosure.

FIG. 3 is a diagram illustrating a mobile communication system, according to an embodiment of the present disclosure.

Referring to FIG. 3, a mobile communication system 300 includes a UE 310, a first BS 320, a second BS 330 connected to the UE 310 through wired/wireless communication, and the MME 340 connected to the first BS 320 and the second BS 330. FIG. 3 illustrates two BSs 320 and 330 and one UE 310 for convenience of description; however, any number of BSs and UEs may be included in the mobile communication system 300.

The UE 310 may be embodied as at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to embodiments of the present disclosure, the wearable device may include at least one of an accessory type (e.g., a watch, a ring, a bracelet, an anklet, a necklace, glasses, a contact lens, or a head-mounted device (HMD)), a fabric or clothing integrated type (e.g., electronic clothing), a body-mounted type (e.g., a skin pad, or tattoo), and a bio-implantable type (e.g., an implantable circuit).

The first BS 320 and the second BS 330 may communicate by wire or wirelessly with the UE 310. According to embodiments of the present disclosure, the first BS 320 and the second BS 330 may also be referred to as an evolved node B (eNB), an access point (AP), or the like. The first BS 320 and the second BS 330 may be controlled by the MME 340 through a wired or wireless connection with the MME 340.

Figure 4:
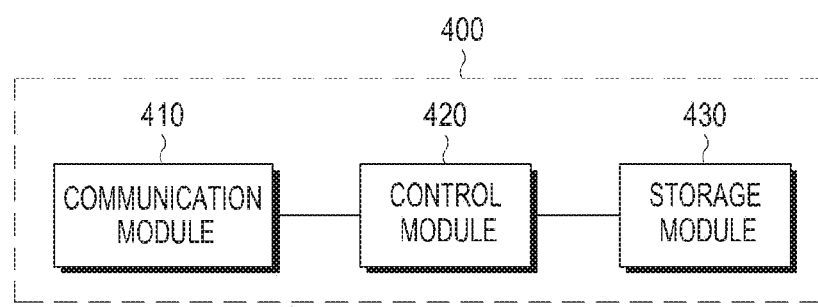
FIG. 4 is a diagram illustrating a configuration of a user equipment, according to an embodiment of the present disclosure.

FIG. 4 is a diagram illustrating a configuration of a UE, according to an embodiment of the present disclosure.

Referring to FIG. 4, a UE 400 includes a communication module 410, a control module 420, and a storage module 430.

The communication module 410 may configure communication with the first BS 320 and the second BS 330. The communication module 410 may communicate with the first BS 320 and the second BS 330 and/or one or more other UEs by being connected to a network through wireless communication or wired communication. The communication module 410 may include at least one of a cellular module, a WiFi module, a bluetooth (BT) module, a global positioning system (GPS) module, a near field communication (NFC) module, and a radio frequency (RF) module.

The wireless communication may use, for example, at least one of LTE, LTE-advanced (LTE-A), code division multiple access (CDMA), wideband CDMA (WCDMA), universal telecommunication system (UMTS), wireless broadband (WiBro), and global system for mobile communications (GSM) as a cellular communication protocol. The wired communication may include, for example, at least one of a universal serial bus (USB), a high definition multimedia interface (HDMI), recommended standard 232 (RS-232), and a plain old telephone service (POTS). The network may include a telecommunication network, for example, at least one of a computer network (e.g., a local area network (LAN) or a wide area network (WAN)), the Internet, and a telephone network.

The communication module 410 may configure a first security authentication message related to the security authentication of the UE 400 to be transmitted to and received from the first BS 320. The first security authentication message may include a first security mode command message and a first security mode complete message. For convenience, a security authentication message transmitted and received between the UE 400 and the first BS 320 is described as a first security authentication message, and a security authentication message transmitted and received between the UE 400 and the second BS 330 is described as a second security authentication message.

The communication module 410 may transmit and receive the second security authentication message between the UE 400 and the second BS 330 when the cell reselection event is generated. The second security authentication message, like the first security authentication message, may include a second security mode command message and a second security mode complete message.

The control module 420 may include one or more of a central processing unit (CPU), an application processor (AP), and a communication processor (CP). The control module 420 may execute, for example, an operation or data processing related to control and/or communication of one or more elements of the UE 400.

When a cell reselection event between the UE 400 and the second BS 330 is generated before the security authentication between the UE 400 and the first BS 320 is completed (specifically, when the UE 400 has transmitted the first security mode complete message to the first BS 320 but has not received a response (L2ACK) for the first security mode complete message from the first BS 320), the control module 420 may control the UE 400 to make security states of the UE 400 and the second BS 330 match. That is, when a second security mode command message having the "modify" attribute has been received from the second BS 330 in a state in which a security authentication procedure has not yet been completed, even though the security state of the UE 400 is a "not-started" state, the security state of the UE 400 may be configured as the "started" state to match the security state of the second BS 330. Therefore, the control module 420 may update first security information stored in the UE 400, based on second security information included in a second security mode command message received from the second BS 330.

When a response (L2ACK) for the first security mode complete message has been received from the first BS 320, the control module 420 may determine that the security authentication with the first BS 320 is completed.

When the cell reselection event is generated, the control module 420 may determine that the security states of the UE 400 and the first BS 320 are different types of states. According to the generation of the cell reselection event, the UE 400 may predict a mismatch of the first BS 320 and the second BS 330 and the security states.

The storage module 430 may include a volatile and/or non-volatile memory. The storage module 430 may store, for example, a command or data related to one or more other elements of the UE 400. According to embodiments of the present disclosure, the storage module 430 may store software and/or various programs. The various programs may include, for example, a kernel, a middleware, an application programming interface (API) and/or application program (or "application"), or the like.

When the first security authentication message has been received, the control module 420 may store first security information included in the first security authentication message in the storage module 430. Further, when the second security authentication message has been received, the control module 420 may store second security information included in the second security authentication message in the storage module 430.

Figure 5:
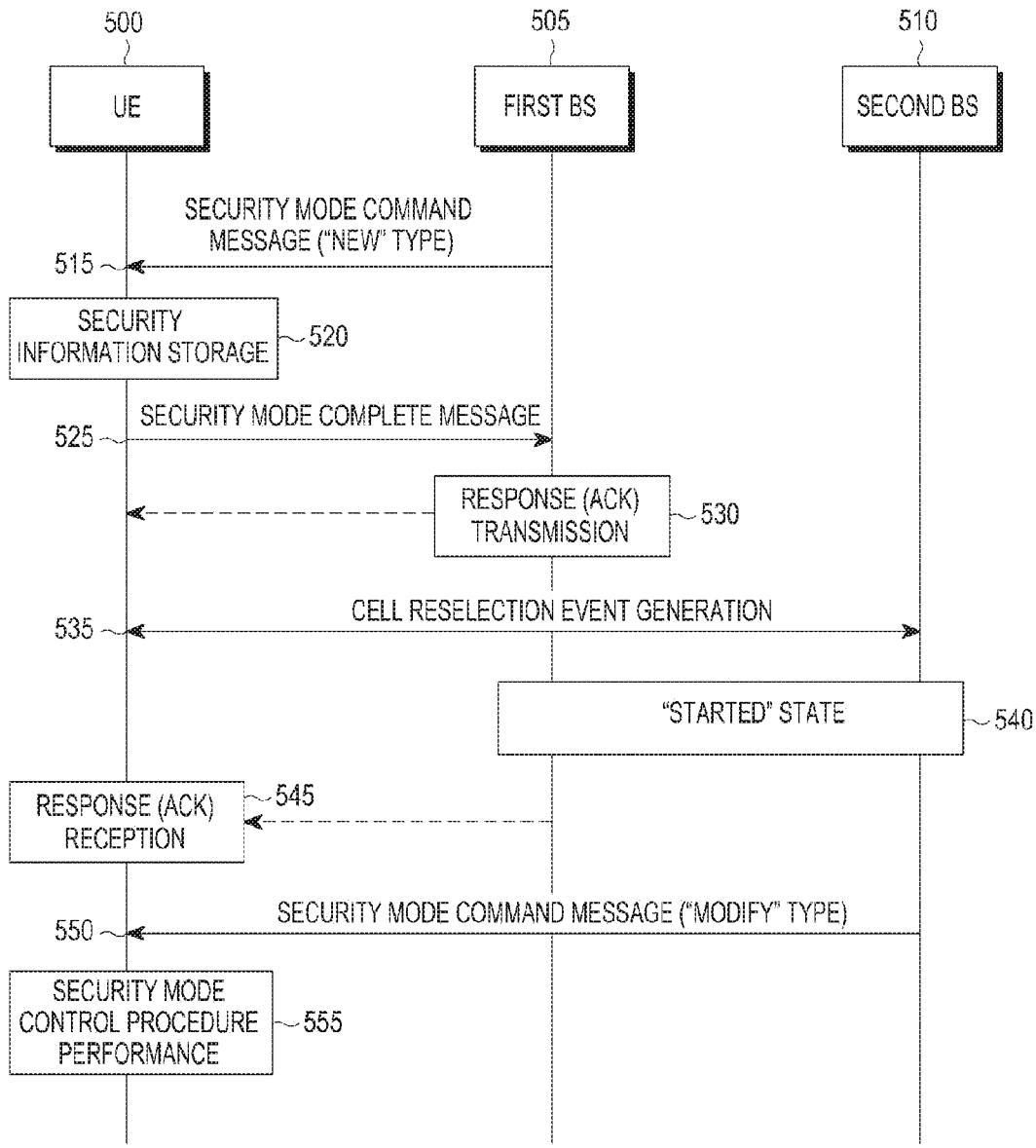
FIG. 5 is a diagram illustrating a security authentication procedure in a mobile communication system, according to an embodiment of the present disclosure.

FIG. 5 is a diagram illustrating a security authentication procedure in a mobile communication system, according to embodiments of the present disclosure.

Referring to FIG. 5, a UE 500 receives a security mode command message from the first BS 505 for security authentication, in step 515. The security mode command message received from the first BS 505 may correspond to a message having a "new" attribute.

The UE 500 stores security information, in step 520, and transmits a security mode complete message to the first BS 505, in step 525, in response to step 515. The first BS 505 transmits a response to the security mode complete message to the UE 500, in step 530.

The first BS 505 generates a cell reslection event, in step 535, and then configures a security state of the first BS 505 as a "started" state, in step 540. Change information of the security state of the first base station 505 may be shared with a second BS 510 an MME (e.g., the MME 340 of FIG. 3). Therefore, a security state of the second BS 510 may also be configured as the "started" state. However, the UE 500 has not yet received the response (i.e., the L2ACK) from the first BS 505 when the cell reselection event is generated in step 535, resulting in a determination that the security authentication is in an incomplete (or aborted) state. FIG. 5 illustrates that security states of the first BS 505 and the second BS 510 are configured in step 540 to be in the "started" state, and then the UE 500 receives a response from the first BS 505 in step 545, but this is only an example for convenience of description. That is, according to embodiments of the present disclosure, the sequence of steps 540 and 545 may be changed.

According to the generation of the cell reselection event in step 535, the UE 500 receives the security mode command message from the second BS 510, in step 550. The security mode command message received from the second BS 510 may correspond to a message having a "modify" attribute.

Even though a security mode command message having the "modify" attribute has been received, the UE 500 does not process a reception of the security mode command message as failed, and performs a security mode control procedure for the security authentication, in step 555. The security mode control procedure of step 555 may include an operation of matching the security mode with the security state of the first BS 505 or the second BS 510. In addition, the security mode control procedure of step 555 may include an operation of updating first security information stored in the UE 500 according to security information included in a security mode command message (i.e., the second security command message) having the "modify" type. According to embodiments of the present disclosure, the UE 500 may not delete security information (i.e., the first security information) received from the first BS 505 and then stored, even though the cell reselection event is generated. When the security mode command message having the "modify" type has been received from the second BS 510, the UE 500 may perform a security authentication with the second BS 510 using the first security information stored in the UE 500. According to FIG. 5, it is possible to prevent the waste of time in resuming communication between the UE 500 and the second BS 510), thereby preventing a decrease in the throughput of the mobile communication system.

Figure 6:
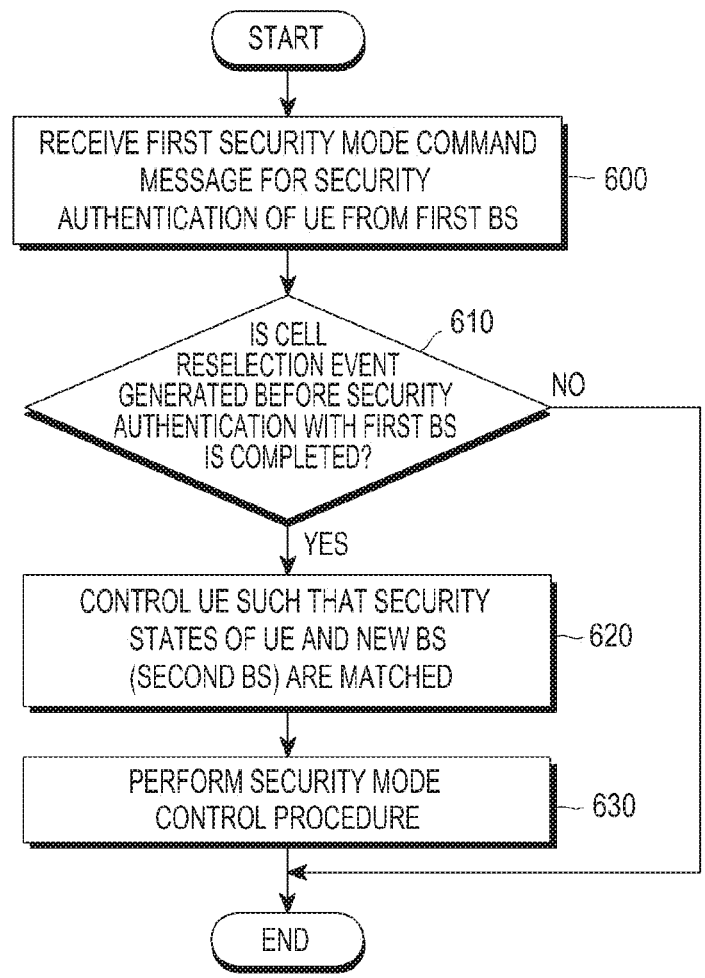
FIG. 6 is a flowchart illustrating a security authentication procedure, according to an embodiment of the present disclosure.

FIG. 6 is a flowchart illustrating a security authentication procedure of a UE, according to an embodiment of the present disclosure.

As shown in FIG. 6, a UE (e.g., the UE 310) receives a first security mode command message for a security authentication of UE from a first BS (e.g., the first BS 320), in step 600.

The UE 310 determines whether a cell reselection event has been generated before the security authentication with the first BS 320 is completed, in step 610. When the UE 310 determines that the cell reselection event has not been generated before the security authentication is completed, the process terminates.

When the UE 310 determines that the cell reselection event has been generated before the security authentication is completed, the UE 310 is controlled so that the security states of the UE 310 and the new BS (e.g., the second BS 330) match with each other, in step 620.

The UE 310 performs a security mode control procedure based on the security information received from the second BS 330, in step 630.

Software components including instructions or code for performing the processes described herein may be stored in one or more of the associated memory or storage devices (e.g., read only memory (ROM), fixed or removable memory) and, when ready to be utilized, loaded in part or in whole (e.g., into random access memory (RAM)) and executed by a CPU.

The present disclosure may be utilized in conjunction with the manufacture of integrated circuits, chip sets, or system-on-chips (SoCs). One skilled in the art would know how to dice wafers and package die to produce integrated circuits. Integrated circuits so manufactured are considered part of this disclosure.

While the present disclosure has been shown and described with reference to certain embodiments thereof, it will be understood by those skilled in the art that various changes in form and detail may be made therein without departing from the spirit and scope of the present disclosure as defined by the appended claims.

What is claimed is:

1. A user equipment (UE) in a mobile communication system, the UE comprising:
   a communication module for exchanging first security authentication messages with a first base station (BS) for security authentication of the UE;
   a storage module for storing first security information included in at least one of the first security authentication messages; and
   a control module for, when a cell reselection event between the UE and a second BS is generated before the security authentication with the first BS is completed, controlling the UE to make a security state of the UE match a security state of the second BS by performing a security mode control procedure by the UE for the security authentication,
   wherein the security mode control procedure by the UE comprises:
   receiving a second security mode command message from the second BS when the UE is in a not-start state which indicates that the security authentication with the first BS is not completed,
   determining whether the second security mode command message has a modify type attribute which indicates that a portion of security information in the second security mode command message is changed, and
   matching the security state of the UE with the security state of the second BS according to the changed portion of the security information.

2. The UE of claim 1, wherein, when the cell reselection event is generated, the communication module is configured to exchange second security authentication messages with the second BS.

3. The UE of claim 2, wherein the first security authentication messages include a first security mode command message and a first security mode complete message, and the second security authentication messages include a second security mode command message and a second security mode complete message.

4. The UE of claim 3, wherein, when a response to the first security mode complete message has been received from the first BS, the control module determines that the security authentication with the first BS is completed.

5. The UE of claim 3, wherein, when the second security mode command message has been received according to the generation of the cell reselection event, the control module updates the first security information according to second security information included in the second security mode command massage.

6. The UE of claim 1, wherein the changed portion of the security information is integrity information.

7. The UE of claim 1, wherein, when the cell reselection event is generated, the control module determines that a security state of the UE and a security state of the first BS are of different types.

8. The UE of claim 2, wherein the first security authentication messages and the second security authentication messages include a radio resource controller (RRC) message.

9. A method of controlling a user equipment (UE) in a mobile communication system, the method comprising:
receiving, from a first base station (BS), a first security mode command message for security authentication of the UE;
determining whether a cell reselection event between the UE and a second BS is generated before the security authentication with the first BS is completed; and
controlling the UE to make a security state of the UE match a security state of the second BS by performing a security mode control procedure by the UE for the security authentication, when the cell reselection event is generated before the security authentication with the first BS is completed,
wherein the performing a security mode control procedure by the UE comprises:
receiving a second security mode command message from the second BS when the UE is in a not-start state which indicates that the security authentication with the first BS is not completed,
determining whether the second security mode command message has a modify type attribute which indicates that a portion of security information in the second security mode command message is changed, and
matching the security state of the UE with the security state of the second BS according to the changed portion of the security information.

10. The method of claim 9, wherein determining whether the cell reselection event is generated comprises determining that the cell reselection event is generated when a second security mode command message is received from the second BS.

11. The method of claim 10, further comprising:
storing first security information included in the first security mode command message; and
updating the first security information according to second security information included in the second security mode command message, when the second security mode command message is received.

12. The method of claim 9, wherein the changed portion of the security information is integrity information.

13. The method of claim 9, further comprising:
transmitting a first security mode complete message to the first BS in response to the first security mode command message;
receiving, from the first BS, a response to the first security mode complete message; and
determining that the security authentication with the first BS is completed when the response is received.

14. The method of claim 9, further comprising:
when the cell reselection event is generated, determining that a security state of the UE and a security state of the first BS are of different types.

15. The method of claim 9, wherein the changed portion of the security information is a key value.

16. A method of controlling a user equipment (UE) in a mobile communication system, the method comprising:
receiving, by the UE, from a first base station (BS), a first security mode command message for security authentication of the UE, the first security mode command message comprising first security information;
storing the first security information at the UE;
transmitting, from the UE, to the first BS, a security mode complete message, in response to the first security mode command message;
performing, by the UE, cell reselection with a second BS prior to reception of an acknowledgement of the security mode complete message from the first BS; and
controlling the UE to make a security state of the UE match a security state of the second BS by performing a security mode control procedure by the UE for the security authentication,
wherein the performing a security mode control procedure by the UE comprises:
receiving a second security mode command message from the second BS when the UE is in a not-start state which indicates that the security authentication with the first BS is not completed,
determining whether the second security mode command message has a modify type attribute which indicates that a portion of security information in the second security mode command message is changed, and
matching the security state of the UE with the security state of the second BS according to the changed portion of the security information without sending a security mode failure message to the second BS.

17. The method of claim 16, further comprising:
receiving, at the UE, from the second BS, a second security mode command message upon performing cell reselection with the second BS.

18. The method of claim 17, wherein the first security mode command message is of a "new" type, and the second security mode command message is of a "modify" type.

19. The method of claim 18, wherein matching security states of the UE and the second BS comprises updating the first security information according to second security information in the second security mode command message.

20. The method of claim 16, wherein the changed portion of the security information is integrity information.

* * * * *